Nov. 11, 1930.        H. LIECHTY        1,781,334
TRACK VEHICLE
Filed Sept. 15, 1927
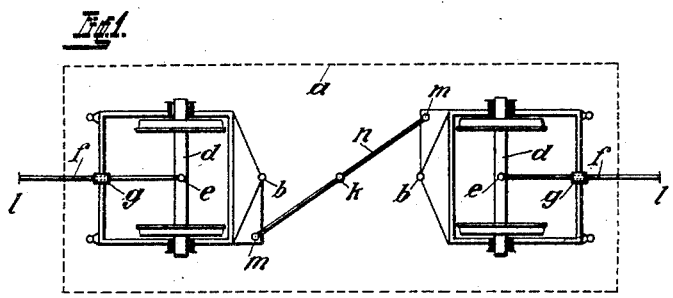
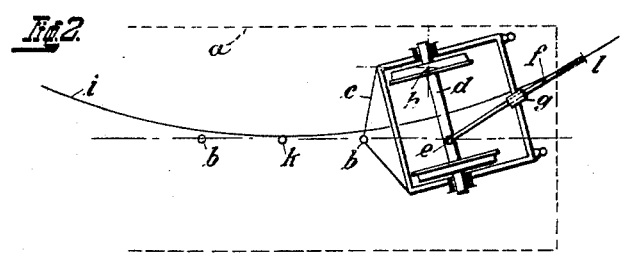
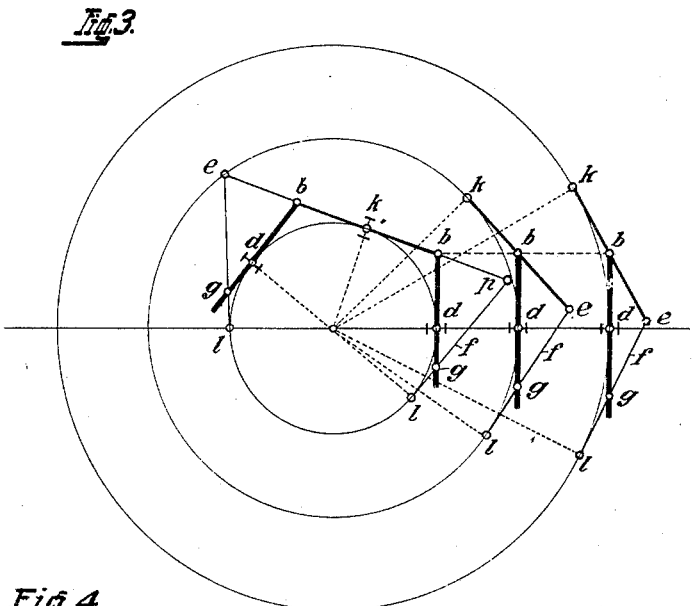
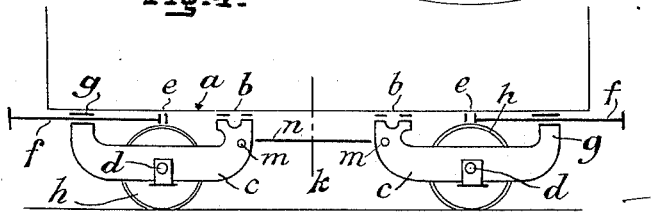
H. Liechty
INVENTOR
By Marles & Clark
Attys.

Patented Nov. 11, 1930

1,781,334

UNITED STATES PATENT OFFICE

HERMANN LIECHTY, OF BERN, SWITZERLAND, ASSIGNOR TO WILHELM KAUFMANN, OF BERN, SWITZERLAND

TRACK VEHICLE

Application filed September 15, 1927, Serial No. 219,736, and in Switzerland September 25, 1926.

It is a well known fact that in track-vehicles with 2 single-axle trucks the draw-bar, which conveys the drawing-power from the rail-motor-car or from the engine to the other cars is attached either to the frame of the vehicle itself or to that of the truck.

In the present invention the draw-bar is not only used to convey the tractive power, but also for the positive radial adjustment of the truck. For this purpose the draw-bar is, on the one hand, attached to the main frame, while on the other hand it is so mounted on the truck that, during the swinging of the draw bar when running over a curved track, the main-frame swings out towards the outer side of the curve whereby the wheel-axle is radially adjusted.

The object of the invention is, by means of this positive radial adjustment, to reduce the resistance while running over curved tracks and to lessen the wear of the rails and wheels.

The drawing shows a diagrammatical plan for carrying the invention into effect.

Fig. 1 is a plan view of a truck in the position it assumes on a straight track.

Fig. 2 is a view similar to Fig. 1 showing the truck in a different position.

Fig. 3 in a distorted scale, affords a proof of the radial adjustment of the truck wheel-axle in all curves according to this application.

Fig. 4 is a diagrammatic section through a car showing the invention applied thereto.

The single axle trucks $c$ are attached to the vehicle frame $a$ by pivots $b$. The draw-bar $f$ is pivoted to the frame $a$ at $e$ and is mounted for movement longitudinally in a gripper $g$ non-slidably and pivotally connected to one of the frame members of the truck $c$ whereby the latter as well as the draw-bar $f$ may freely turn about their respective pivotal axes $b$ and $e$, the movement of one, however, being transmitted to the other.

When the draw-bars $f$ of a car are swung out, as when the car passes over a curved portion of the track the body of the car $a$ swings outwardly in the direction of the outside of the track curve. In the embodiment of the invention illustrated the movement of the body of the car takes place in a manner and to an extent such that the longitudinal axis of the car frame indicated by dot and dash line in Figure 2 forms a tangent to the center line $i$ of the track. Due to the difference in the position of the pivotal axes $b$ and $e$ of the truck and draw-bar, respectively, when said bar is turned, as during the passage of the car over a curved section of track the axle is moved to a position radially of the curve of the track.

A rod $n$ is connected at its terminals at $m$ to the trucks and, in the case of an end car, it positively effects adjustment of the rear truck—which is not coupled to an adjacent car—so as to maintain the proper radial adjustment of such truck. This rod $n$, however, may be dispensed with if desired.

The radial adjustment of the wheel axle depends upon the correct selection of point $e$. The fixing point $e$ is found by drawing the wheel-axle $d$ radially through point $h$ and then seeking the point of intersection of the draw-bar $f$ held by the gripper $g$ with the longitudinal axis of the car.

It is obvious from Fig. 3 that the radial position of the truck-wheel axles in all curved tracks is ensured, when the fixing point $e$ lies over the centre of the axle $d$ and $b$, $e$ equal to $e$, $g$ is chosen.

It is also obvious from Fig. 3 that the radial position of the truck-wheel axles in all curved tracks is ensured, when $b$, $e$ equalling $b$, $k$ is chosen, $k$ representing the middle between the two truck-wheel axles.

Fig. 3 also shows that the radial position of the truck-wheel axles is ensured in all curved tracks, when the length $e$, $c—l$ of the draw-bar $f$ equals $e—k$, whereby $k$ again represents the centre between the two trucks.

Fig. 3 shows further that if the above measurements are observed, there is nothing to prevent the insertion at point $k$ of a third, non-swingable wheel-axle between the two trucks, which, under the above-mentioned circumstances, always remains in a radial position.

The single-axle truck may, for instance, in the case of electrically driven motor-cars with axle-motors or with cardan drive be formed by the motor-shell itself or by the cardan-shaft pole.

What I claim as new is:

1. In a track vehicle, a vehicle frame, trucks pivoted at their inner ends to the vehicle frame, each truck being provided with a wheel axle, and a draw bar for each truck pivoted to the vehicle frame above the corresponding truck and pivotally connected with the latter whereby to effect swinging out of the vehicle frame towards the outer edge of track curves and adjustment of the trucks to dispose the wheel axles radially with respect to said curves.

2. A track vehicle as claimed in claim 1, characterized in that the pivotal axis of the draw bar is located above the truck axle at a point equidistant from the pivotal axis of the truck and the point of connection between the draw bar and the truck during the normal position of the latter.

3. A track vehicle as claimed in claim 1, characterized in that the distance between the pivotal connections of the respective trucks and the frame is twice the distance between the pivotal axis of each individual truck and the pivotal axis of the draw bar associated therewith.

4. A track vehicle as claimed in claim 1, characterized in that the total length of the draw bar is equal to the sum of the distance between the points of pivotal connection of the draw bar and the truck with the frame and one-half the distance between the pivotal connections between the respective trucks and the vehicle frame.

Signed at Bern, this 3d day of September, 1927.

HERMANN LIECHTY.